(12) United States Patent
Radivojevic et al.

(10) Patent No.: US 8,086,971 B2
(45) Date of Patent: Dec. 27, 2011

(54) APPARATUS, METHODS AND COMPUTER PROGRAM PRODUCTS PROVIDING FINGER-BASED AND HAND-BASED GESTURE COMMANDS FOR PORTABLE ELECTRONIC DEVICE APPLICATIONS

(75) Inventors: Zoran Radivojevic, Helsinki (FI);
Yanming Zou, Beijing (CN); Kong Qiao Wang, Beijing (CN); Roope Tapio Takala, Helsinki (FI); Vuokko Tuulikki Lantz, Vantaa (FI); Reijo Lehtiniemi, Helsinki (FI); Jukka Ilmari Rantala, Espoo (FI); Ramin Vatanparast, Irving, TX (US)

(73) Assignee: Nokia Corporation, Espoo (FI)

( * ) Notice: Subject to any disclaimer, the term of this patent is extended or adjusted under 35 U.S.C. 154(b) by 391 days.

(21) Appl. No.: 11/477,508

(22) Filed: Jun. 28, 2006

(65) Prior Publication Data
US 2008/0005703 A1    Jan. 3, 2008

(51) Int. Cl.
*G06F 3/033* (2006.01)
(52) U.S. Cl. ...................................... 715/863
(58) Field of Classification Search ................ 715/863
See application file for complete search history.

(56) References Cited

U.S. PATENT DOCUMENTS

| | | | |
|---|---|---|---|
| 5,821,922 A | 10/1998 | Sellers | 345/157 |
| 6,147,678 A * | 11/2000 | Kumar et al. | 345/158 |
| 6,624,833 B1 * | 9/2003 | Kumar et al. | 715/863 |
| 6,690,354 B2 | 2/2004 | Sze | 345/156 |
| 6,710,770 B2 | 3/2004 | Tomasi et al. | 345/168 |
| 6,720,949 B1 * | 4/2004 | Pryor et al. | 345/158 |
| 6,771,294 B1 * | 8/2004 | Pulli et al. | 715/863 |
| 6,819,782 B1 * | 11/2004 | Imagawa et al. | 382/115 |
| 6,950,534 B2 * | 9/2005 | Cohen et al. | 382/103 |
| 7,009,663 B2 | 3/2006 | Abileah et al. | 349/12 |
| 7,050,177 B2 | 5/2006 | Tomasi et al. | 356/614 |
| 7,053,967 B2 | 5/2006 | Abileah et al. | 349/12 |
| 7,231,609 B2 * | 6/2007 | Baudisch | 715/769 |
| 7,487,468 B2 * | 2/2009 | Tanaka et al. | 715/863 |
| 7,519,223 B2 * | 4/2009 | Dehlin et al. | 382/203 |
| 2002/0000977 A1 | 1/2002 | Vranish | 345/173 |
| 2002/0090146 A1 * | 7/2002 | Heger et al. | 382/291 |
| 2002/0093666 A1 * | 7/2002 | Foote et al. | 356/621 |
| 2003/0048312 A1 * | 3/2003 | Zimmerman et al. | 345/863 |
| 2004/0119763 A1 | 6/2004 | Mizobuchi et al. | 345/863 |
| 2005/0151850 A1 * | 7/2005 | Ahn et al. | 348/207.99 |

(Continued)

FOREIGN PATENT DOCUMENTS

WO    WO-95/22097    8/1995

(Continued)

OTHER PUBLICATIONS

"59.3 Integrated Optical Touch Panel in a 14.1 AMLCD", Adi Abileah et al., SID 04 Digest, v. 35, Issue 1, pp. 1544-1547.

(Continued)

*Primary Examiner* — Weilun Lo
*Assistant Examiner* — Shashi Becker
(74) *Attorney, Agent, or Firm* — Harrington & Smith (57) ABSTRACT

A method includes executing a gesture with a user-manipulated physical object in the vicinity of a device; generating data that is descriptive of the presence of the user-manipulated object when executing the gesture; and interpreting the data as pertaining to at least one object, such as an object displayed by the device.

33 Claims, 9 Drawing Sheets

U.S. PATENT DOCUMENTS

| | | | |
|---|---|---|---|
| 2006/0010400 A1* | 1/2006 | Dehlin et al. | 715/856 |
| 2006/0136846 A1* | 6/2006 | Im et al. | 715/863 |
| 2006/0267966 A1* | 11/2006 | Grossman et al. | 345/179 |
| 2007/0064004 A1* | 3/2007 | Bonner et al. | 345/442 |
| 2007/0130547 A1 | 6/2007 | Boillot | 715/863 |

FOREIGN PATENT DOCUMENTS

| | | |
|---|---|---|
| WO | WO-00/39663 | 7/2000 |
| WO | WO-03/096172 A1 | 11/2003 |

OTHER PUBLICATIONS

"56.3: Active Matrix LCD with Integrated Optical Touch Screen", Willem den Boer et al., SID 03 Digest (Baltimore, 2003) pp. 1494-1497.

* cited by examiner

APPARATUS, METHODS AND COMPUTER PROGRAM PRODUCTS PROVIDING FINGER-BASED AND HAND-BASED GESTURE COMMANDS FOR PORTABLE ELECTRONIC DEVICE APPLICATIONS

TECHNICAL FIELD

The teachings in accordance with the exemplary embodiments of this invention relate generally to user interfaces to electronic devices and, more specifically, relate to manually activated user input devices, methods, systems and computer program products.

BACKGROUND

Input devices employed in the converging multimedia electronics industry are becoming increasingly important. The human-computing terminal interface has long challenged systems designers, yet has not significantly evolved since the advent of the mouse several decades ago. This is a particularly challenging problem in the area of mobile and wireless devices, where the objectives of device miniaturization and usability directly conflict with one another. A natural and intelligent interaction between humans and computing terminals (CT) can be achieved if the simplest modalities, such as finger movement and/or user gestures, are used to provide basic input information to the CT (non-limiting examples of which can include multimedia terminals, communication terminals, display dominated systems (DDS) and devices, gaming devices and laptop computers).

Technology related to input devices has conventionally relied on a set of electro-mechanical switches (such as the classic keyboard). Such an approach requires a relatively large area for a set of switches (keyboard keys), which are usually dedicated to only one operation. A more advanced solution is offered by touch screen displays where touch sensitive switches are embedded into the display itself, such as in Active Matrix LCD with Integrated Optical Touch Screen (AMLCD) technology. In this approach the "single button" trend is evolving towards that of a "distributed sensor system" that may be embedded into the device and/or even directly into the display itself (AMLCD). The physical operation of such a sensor-based input device can be based on mechanical movement of different materials, change of electrical conductivity/capacity, influences by electrostatic field or optical properties (made by finger shadow/reflection from the surface). Reference with regard to AMLCD technology may be made to documents: 56.3, W. den Boer et al., "Active Matrix LCD with Integrated Optical Touch Screen", SID 03 Digest (Baltimore, 2003) pgs. 1494-1497, and to 59.3, A. Abileah et al., "Integrated Optical Touch Panel in a 14.1" AMLCD", SID 04 Digest, v. 35, Issue 1, pgs. 1544-1547, and incorporated by reference herein in their entireties.

Reference may also be made to U.S. Pat. No. 7,009,663 B2 (Mar. 7, 2006), entitled "Integrated Optical Light Sensitive Active Matrix Liquid Crystal display", A. Abileah et al., and U.S. Pat. No. 7,053,967 B2 (May 30, 2006), entitled "Light Sensitive Display", A. Abileah et al. (both assigned to Planar Systems, Inc.), which are incorporated by reference herein in their entireties.

The current trend in the development of multimedia device equipment involves hardware miniaturization together with a demand to provide a large input capacity. If the input device can be miniaturized then more space can be allocated for the visualization component(s), particularly in display dominated concept (DDC) devices. The situation in gaming devices is even more challenging, since improvements in the input devices may provide new design freedom and additional game-related functionalities.

Examples of current user input devices include those based on touch-motion, as in certain music storage and playback devices, and certain personal digital assistant (PDA) and similar devices that are capable of recognizing handwritten letters and commands.

Also of interest may be certain structured light based systems, such as those described in U.S. Pat. No. 6,690,354 B2 (Feb. 10, 2004), entitled "Method for Enhancing Performance in a System Utilizing an Array of Sensors that Sense at Least Two Dimensions", Sze; U.S. Pat. No. 6,710,770 (Mar. 23, 2004), entitled "Quasi-Three-Dimensional Method and Apparatus to Detect and Localize Interaction of User-Object and Virtual Transfer Device", Tomasi et al.; and U.S. Pat. No. 7,050,177 B2 (May 23, 2006), entitled "Method and Apparatus for Approximating Depth of an Object's Placement Onto a Monitored Region with Applications to Virtual Interface Devices", Tomasi et al. (all assigned to Canesta, Inc.), which are incorporated by reference herein in their entireties.

SUMMARY OF THE EXEMPLARY EMBODIMENTS

The foregoing and other problems are overcome, and other advantages are realized, in accordance with the non-limiting and exemplary embodiments of this invention.

In accordance with one aspect thereof the exemplary embodiments of this invention provide a method that includes executing a gesture with a user-manipulated physical object in the vicinity of a device; generating data that is descriptive of the presence of the user-manipulated object when executing the gesture; and interpreting the data as pertaining to at least one object displayed by the device.

In accordance with another aspect thereof the exemplary embodiments of this invention provide computer program product embodied in a computer readable medium, execution of the computer program product by at least one data processor resulting in operations that comprise, in response to a user executing a gesture with a user-manipulated physical object in the vicinity of a device, generating data that is descriptive of the presence of the user-manipulated object when executing the gesture; and interpreting the data as pertaining to information displayed to the user.

In accordance with a further aspect thereof the exemplary embodiments of this invention provide a device that comprises a unit to display information; an imaging system to generate data that is descriptive of the presence of a user-manipulated object when executing a gesture; and a data processor to interpret the data as pertaining to displayed information.

In accordance with a further aspect thereof the exemplary embodiments of this invention provide a method that includes, in response to a user employing at least one finger to form a gesture in the vicinity of a device, generating data that is descriptive of a presence of the at least one finger in forming the gesture; and interpreting the data as pertaining to at least one object that appears on a display screen.

In accordance with a still further aspect thereof the exemplary embodiments of this invention provide an apparatus that includes a display to visualize information; a sensor arrangement that is responsive to the user executing a gesture with a user-manipulated physical object in the vicinity of a surface of the apparatus, the sensor arrangement having an output to provide data descriptive of the presence of the user-manipulated object when executing the gesture; and a unit having an input coupled to the output of the sensor arrangement and operating to interpret the data to identify the executed gesture, and to interpret the identified gesture as pertaining in some manner to visualized information.

BRIEF DESCRIPTION OF THE DRAWINGS

The foregoing and other aspects of the teachings of this invention are made more evident in the following Detailed Description, when read in conjunction with the attached Drawing Figures, wherein.

DETAILED DESCRIPTION

Figure 1A:
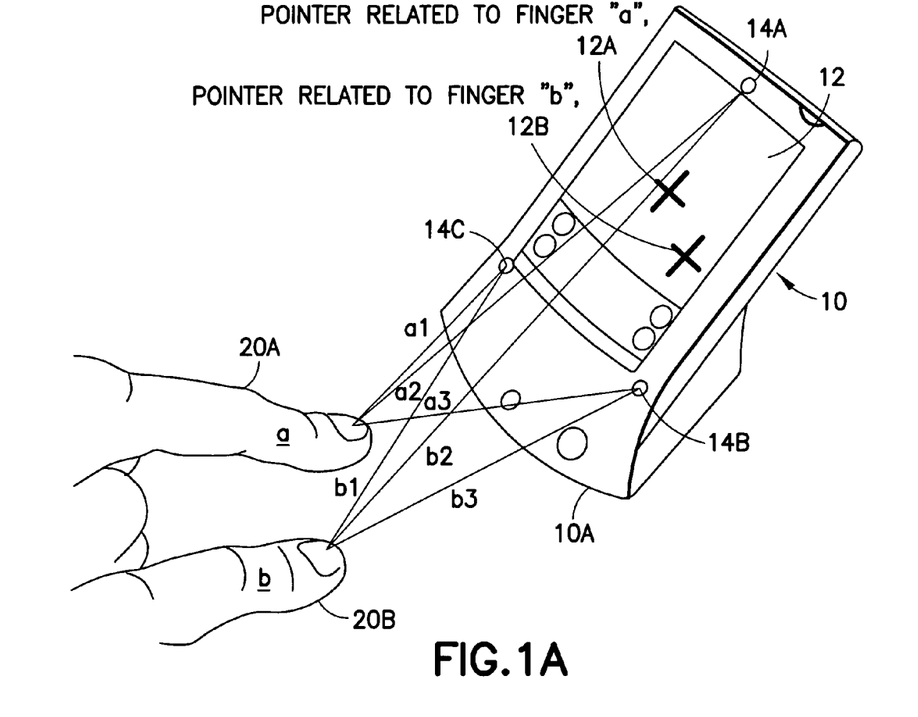
FIG. 1A shows a device that incorporates a plurality of ultrasonic transducers (USTs) as user input devices.
Figure 1B:
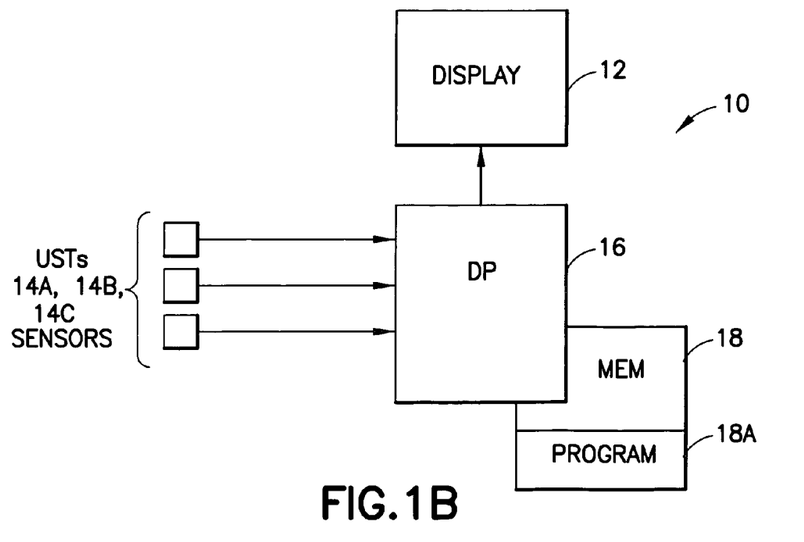
FIG. 1B is a simplified block diagram of the device of FIG. 1A.

Reference is made to FIGS. 1A and 1B, collectively referred to as FIG. 1, that show a device 10, such as a display dominated device having at least one visual display 12 capable of visualizing information, that incorporates a plurality of ultrasonic transducers (USTs) 14A, 14B and 14C (collectively referred to as USTs 14) as user input devices, while FIG. 1B is a simplified block diagram of the device of FIG. 1A. Note in FIG. 1B that the device 10 is assumed to include a data processor (DP) coupled to a memory (MEM) 18 that stores a program 18A that is suitable for use in implementing this exemplary embodiment of the invention. The device 10 may be or may include, as non-limiting examples, a PDA, a wireless communications device, a gaming device, an Internet appliance, a remote control device (such as one suitable for use with a TV set or with public interactive billboards), a music storage and playback device, projectors, a video storage and playback device, a multimedia device, a computer such as a desktop or a laptop computer, or in general any type of electronic device that includes a user interface for presenting information to a user (such as a display screen or display surface) and for receiving commands and/or input information from the user.

In the exemplary embodiment of FIG. 1 the three USTs 14 are arrayed on a surface 10A of the device 10 and enable the use of triangulation to detect the locations in three dimensional space of the user's fingers 20A, 20B (referred to also as finger a, finger b). The device 10 exploits the ultrasonic field established in the vicinity of the surface of the device 10 by the USTs 14 to provide a perception technology that enables the device 10 to perceive and react to finger position, and possibly movement, in real time.

Figure 7:
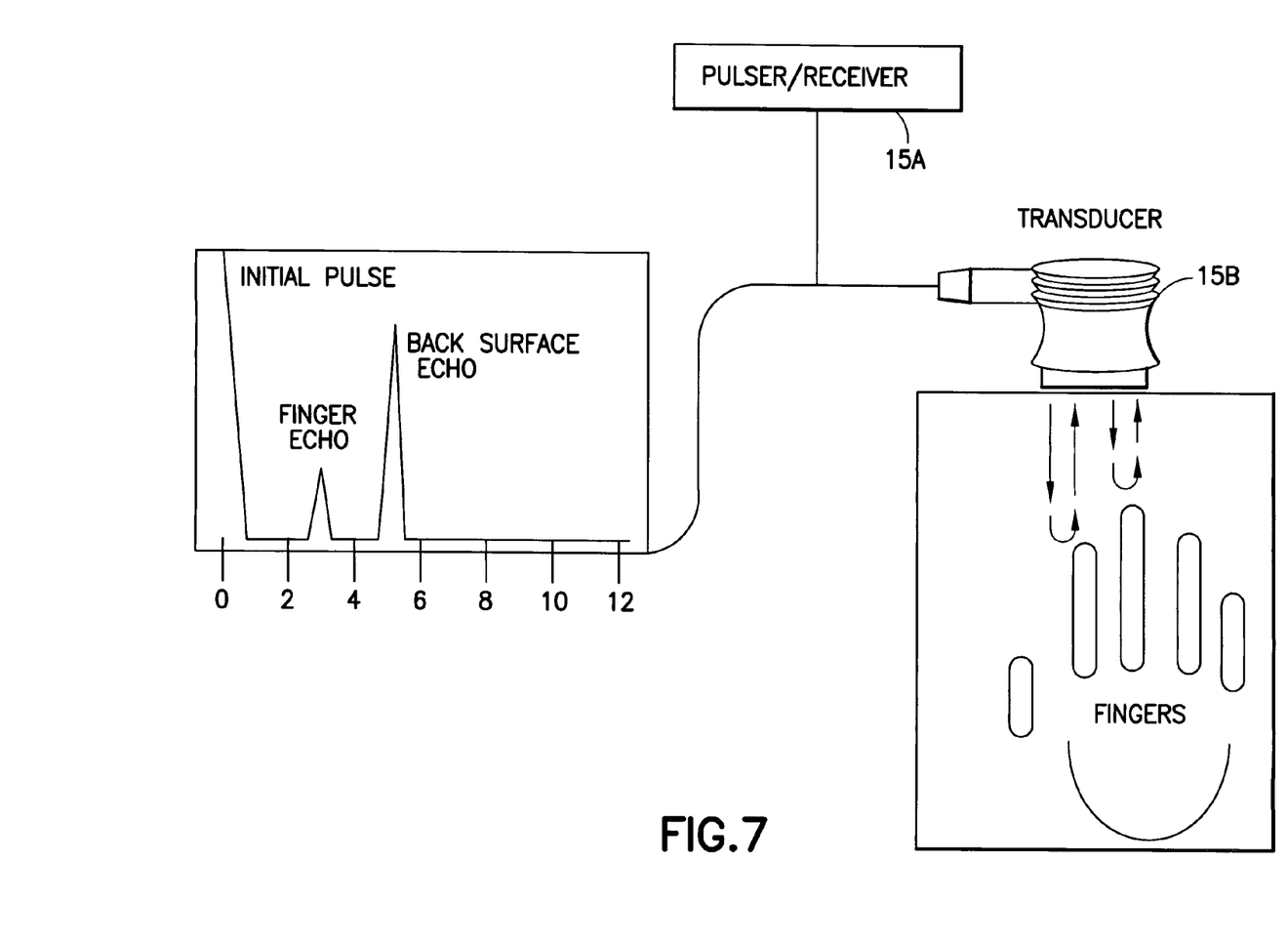
FIG. 7 shows the principles of the ultrasonic observation of finger distance.

In general, a given UST 14 uses high frequency sound energy to conduct examinations and make measurements. To illustrate the general principle, a typical pulse/echo set-up configuration is shown in FIG. 7. A typical UST system includes several functional units, such as a pulser/receiver 15A and the ultrasonic transducer 15B. The pulser/receiver 15A is an electronic device that can produce mechanical movement and/or an electrical pulse, respectively. Driven by the pulser portion the transducer 15B generates high frequency ultrasonic energy. The sound energy is introduced and propagates through the air in the form of waves. When there is a discontinuity (such as a finger movement) in the wave path, part of the energy is reflected back from the discontinuity. The reflected wave signal is transformed into an electrical signal by the transducer 15B and is processed to provide distance from the transducer 15B to the discontinuity (based on a round trip time-of-flight measurement, as is well known). The reflected signal strength may be displayed versus the time from signal generation to when an echo was received. Both phase and intensity change of the reflected signal may also be exploited to measure finger-transducer distances.

When the user's finger(s) or more generally hand(s) enter the scanned field in front of the device 10 the UST 14 system measures the distances to the individual fingers. The three UST 14 sensors (which in some exemplary embodiments may have a fixed relative position on the CT) are capable of providing individual finger-sensor distance measurements (a1, a2, a3, b1, b2, b3). Note that the device 10 may be implemented with less than three UST 14 sensors, however by providing the third UST sensor it is possible to use finger movement for execution and basic operational commands (such as, but not limited to, Select; Copy; Paste; Move; Delete) by observation of a change in direction of the finger movement in three dimensional (3D) space. The device 10 may also be implemented using more than three UST 14 sensors in form of, for example, a UST sensor array when/if higher spatial detection resolution is needed.

In general, it is typically desirable to limit the range of the detection mechanism so that it encompasses a fairly limited volume of space (which may be considered to define a 'working envelope') in the vicinity of the sensing surface (whether the sensors be UST sensors or other types of sensors) of the device 10 so as not to, for example, generate unintended inputs due to the presence and/or movement of background objects, such as other parts of the user's body. Typically the sensing range will be less than about a meter, and more typically the value will be about, for example, 10-20 cm (or less). The maximum sensing range may typically be a function of the sensor technology. For example, the UST embodiments of this invention may typically have a greater detection/sensing range than the AMLCD embodiments discussed below. As can be appreciated, when the user places a finger or fingers, or a hand or hands, within the vicinity of the device 10, "within the vicinity of the device" or sensing surface will be a volume of space, or a plane or more generally a surface, contained within the maximum useful sensing range of the sensing device(s) both in depth (away from the sensing surface) and lateral extent (within an area capable of being sensed from the sensing surface).

Note in FIG. 1A that the detected finger position may be translated and presented to the user by displaying two pointers (e.g., two crosses) 12A, 12B on the display 12.

The described UST 14 system may serve to track the finger position of the user in 3D space and in real time. Visualization of the tracking (which may be used to provide perceptual feedback to the user) can be performed by showing one or more of the pointers 12A, 12B on the display 12. This technique provides visual coordination to the user, and facilitates the manipulation of objects presented on the display 12 (such as icons and command bars). Furthermore, if a standard set of characters is shown on the display 12 the user may be provided with typewriting (keyboarding) capabilities, where a classical keyboard is replaced by a virtual keyboard. Tactile feedback (which appears in mechanical keyboards) can be replaced by, for example, short blinking of a finger "shadow" on the display 12 for indicating that a particular key has been accepted and the character inputted or a corresponding command executed. Furthermore, sound effects may be added to confirm that a certain command has been accepted.

In some applications, instead of detecting particular fingers, all or some of the entire hand can be detected. In other words, a displayed pointer (e.g., 12A) can be associated to the center of gravity of the hand and used to drive/navigate the pointer. Such a configuration may significantly simplify the overall requirements (of hardware and software), and is particularly suitable in those cases when only a single pointer navigation/control is required.

Figure 2A:
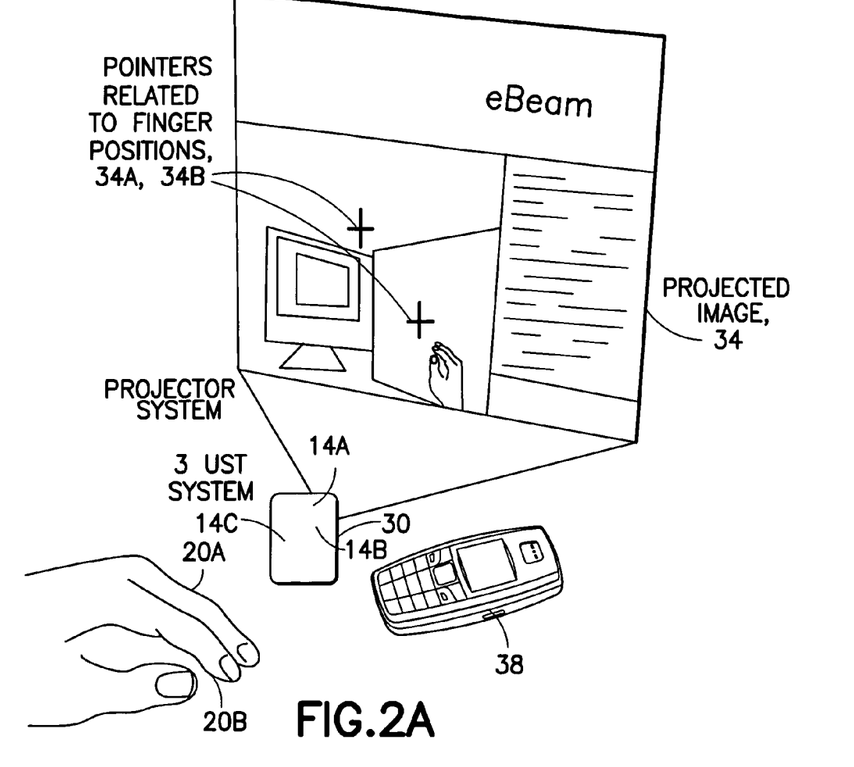
FIG. 2A shows a further exemplary embodiment of this invention where the USTs are incorporated into a device that embodies a mini-projector.
Figure 2B:
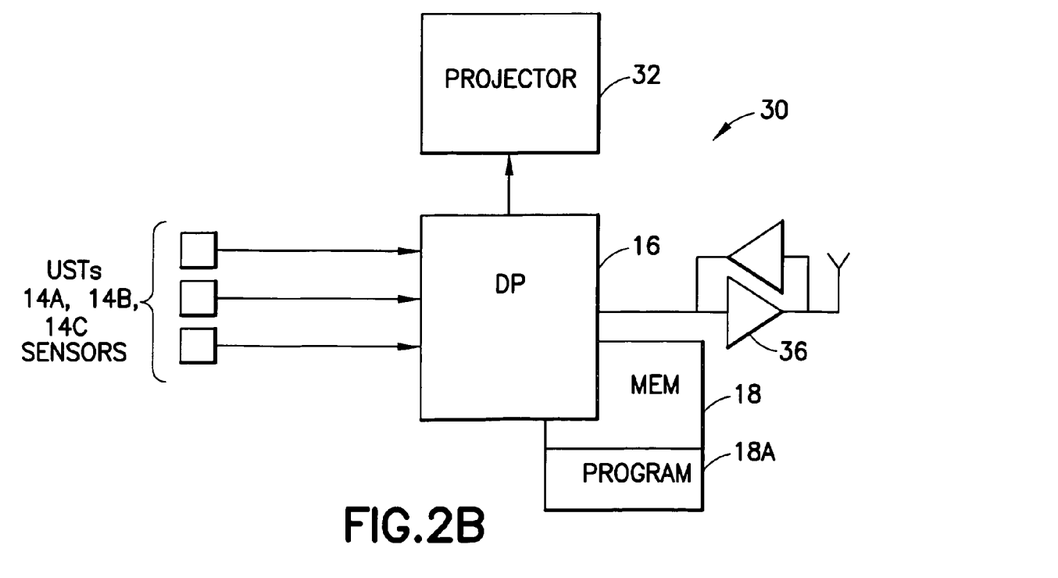
FIG. 2B is a simplified block diagram of the mini-projector device of FIG. 2A.

FIG. 2 shows a further exemplary embodiment of this invention where the UST 14 system is incorporated into a device that embodies a mini-projector 30, while FIG. 2B is a simplified block diagram of the mini-projector device 30 of FIG. 2A. Components that are found as well in FIG. 1 are numbered accordingly. The mini-projector device 30 includes a projector or projection engine 32 coupled to the DP 16 and projects an image 34 for viewing by the user. For the purposes of this invention the image 34 may be considered to be on a "display screen" or a "display surface". Pointers 34A, 34B corresponding to the locations of the user's fingers 20A, 20B can be displayed as well. The mini-projector device 30 may be linked via some wired or a wireless interface 36, such as a Bluetooth transceiver, to a phone or other multimedia device 38, and may display data sourced by the device 38. The same or a similar UST 14 scanning concept may be employed as in FIG. 1. Furthermore, the resulting user input system based on finger/hand placement and/or movement, combined with the projector engine 32, may be exploited for use in, for example, advanced gaming concepts that combine a large projected image and user gesture-based input. The use of a gesture-based language with the larger format displayed image 34 enables enhancements to be made to gaming concepts, as well as the design of games based on dynamical user movements in 3D.

The use of real-time finger tracing and the presentation of attributed pointers on the display/projector image 12/34 can be used to determine basic object-oriented or gesture-oriented commands. Commands such as: Select, Copy, Paste, Move, Delete and Switch may be applied on different displayed objects (such as icons, boxes, scroll-bars and files). These may be classified as object-oriented and gesture/browsing oriented operations, as follows in accordance with several non-limiting examples.

Object-Oriented:
Select:—Finger 1 at a display corner or some reserved area
   Finger 2 moves slowly under a displayed object to be selected
Copy:—when selected click by single finger on the object
Paste:—fast double click by a single finger
Move:—move slowly two fingers located on the moving object
Delete:—double (fast) click by two fingers on previously selected object
Switch:—switching (on/off) is based on change in direction of fingers movement or, alternatively, on a change in finger acceleration.

Figure 3A:
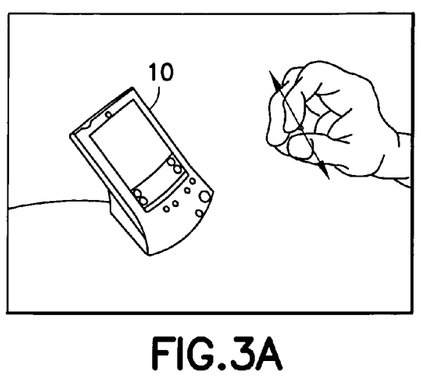
FIGS. 3A, 3B, collectively referred to as FIG. 3, FIGS. 4A-4D, collectively referred to as FIG. 4, FIGS. 5A, 5B, collectively referred to as FIG. 5, and FIG. 6 depict exemplary finger-based gestures that may be used to select various commands for execution in accordance with exemplary embodiments of this invention.
Figure 3B:
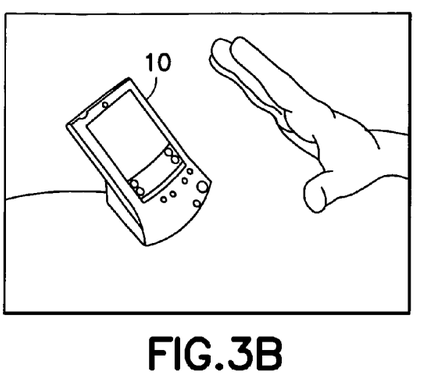
Figure 4A:
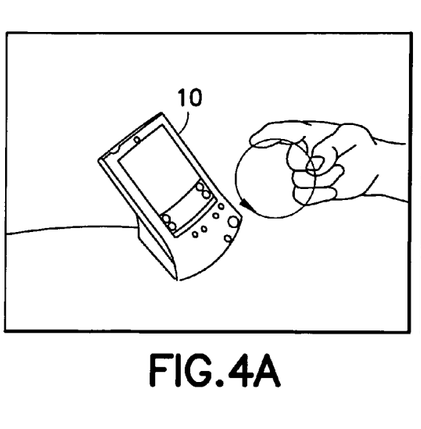
Figure 4B:
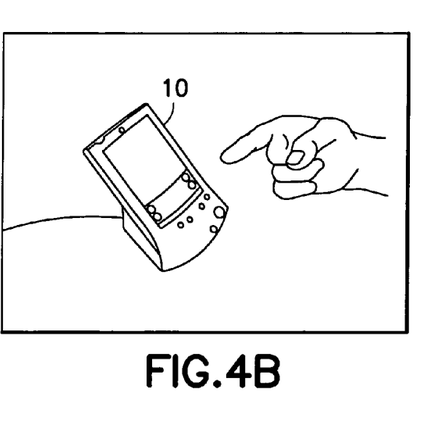
Figure 4C:
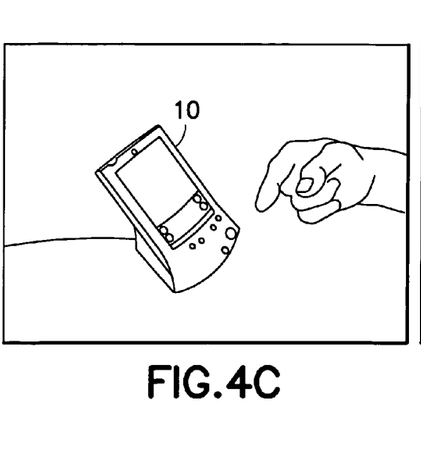
Figure 4D:
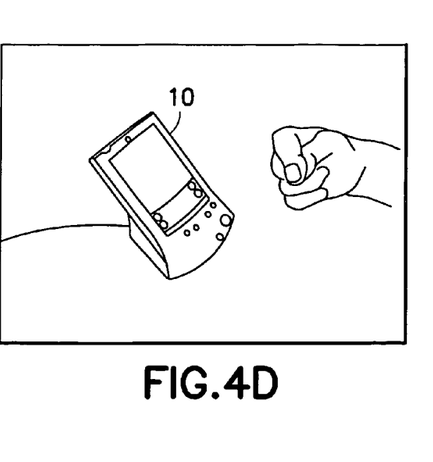
Figure 5A:
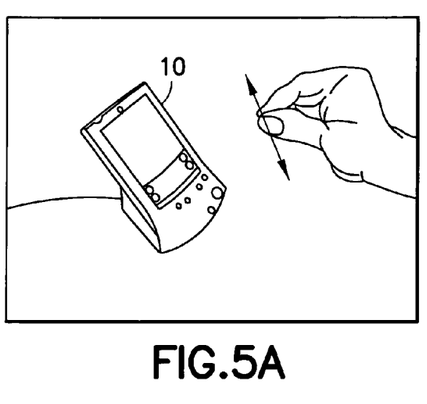
Figure 5B:
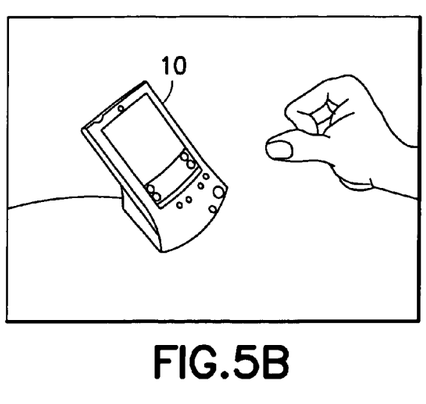
Figure 6:
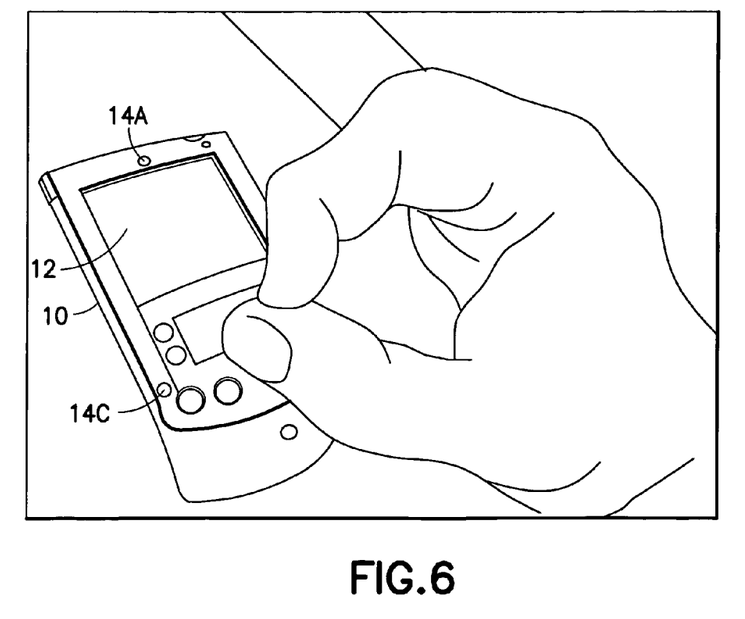

Gesture/Browsing-Oriented:
Select object attributed to the pointer position: Open/closed hand (see FIGS. 3A, 3B)
Forward/Backward Browsing: anticlockwise/clockwise cyclic rotation by a single finger (see FIGS. 4A-4D)
Zoom In/Out: Expand/Close Two Fingers (see FIGS. 5A, 5B and 8D)
Run/Execute pre-selected icon/command: make a circle with two fingers (see FIG. 6).

The exemplary gesture protocols described above enabling manipulation of objects on the display 14 (or the projected display 34, by finger movements or gestures. These exemplary protocols provide a large capacity and design freedom for gesture-based commands and language, and may be used to exploit the full spectrum of the multimedia device 10 capabilities, while also providing enhancements for gaming and other similar applications. The use of exemplary embodiments of this invention are also well suited for use with Internet browser and similar applications, such as when scrolling through HTML pages and selecting links within a displayed page.

Note that while the use of one or more fingers has been described above, it is also within the scope of the exemplary embodiments to employ at least in part a stylus or some other object that is held and manipulated by the user in the energy field of the USTs 14. All such objects, including a human finger or fingers, hand or hands, stick or stylus may be referred to for convenience as a user-manipulated physical object.

It should be appreciated that the exemplary embodiments of this invention can be used with, as several non-limiting examples, gesture-based gaming devices, wireless communications devices, computers and appliances containing computers, robotics communication systems, communication systems for handicapped persons and navigation tables. Note that the ability provided by the exemplary ultrasonic-based embodiments of this invention to significantly reduce the physical size of the user input device(s) enables a corresponding increase in the surface are of the user display device, which is beneficial in small, handheld and portable devices, such as PDAs and cellular telephones as two non-limiting examples.

Note further that the use of the foregoing exemplary embodiments of this invention does not require the user to wear any additional hardware on the hands or fingers. Further, the scalability is improved since the size of a "finger/hand" can be reduced arbitrarily and is not limited to any certain finger/stylus size.

Described now are further exemplary embodiments of this invention, that also use user-manipulated object (e.g., finger-based) gestures, wherein the gestures are detected through the use of an imaging-type device or system, such as one incorporated into the display device, such as one constructed in accordance with the Active Matrix LCD with Integrated Optical Touch Screen (AMLCD) display device technology referenced above. These exemplary embodiments also provide for command/data definition and communication with a computation platform by exploiting finger gestures attributed to predefined commands and protocols, and are suitable for use with DDC devices that employ a minimal number of keymat/keyboards and maximized size of visual display in current and future devices. In these various embodiments, the following exemplary and non-limiting gestures and attributed commands may be employed.

Figure 10A:
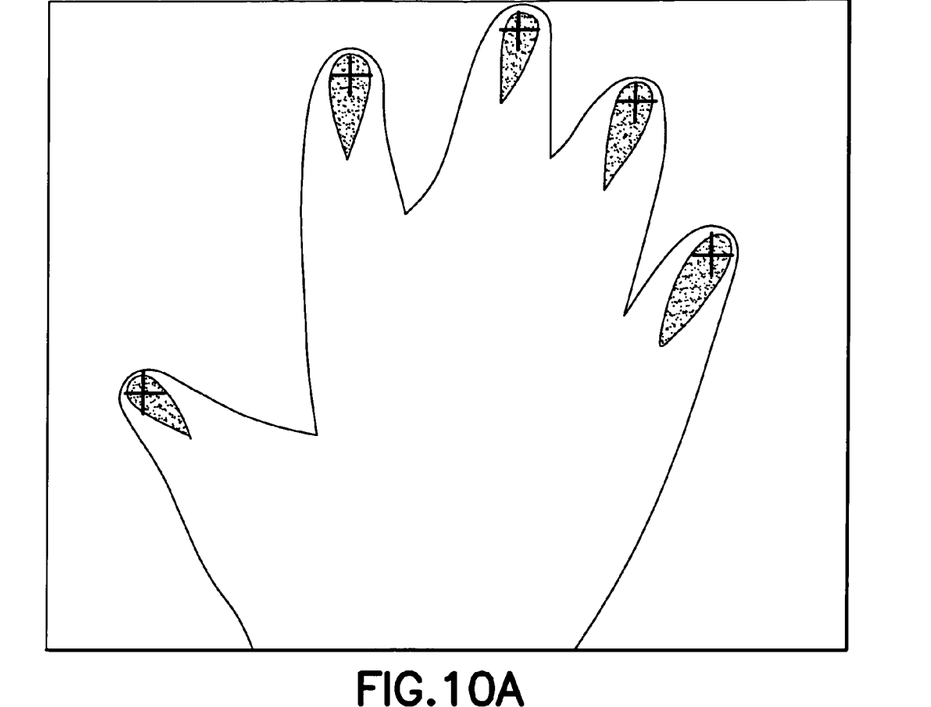
FIG. 10A shows an example of the sensing of multiple points of simultaneous touch detected by device of FIG. 10B.
Figure 10B:
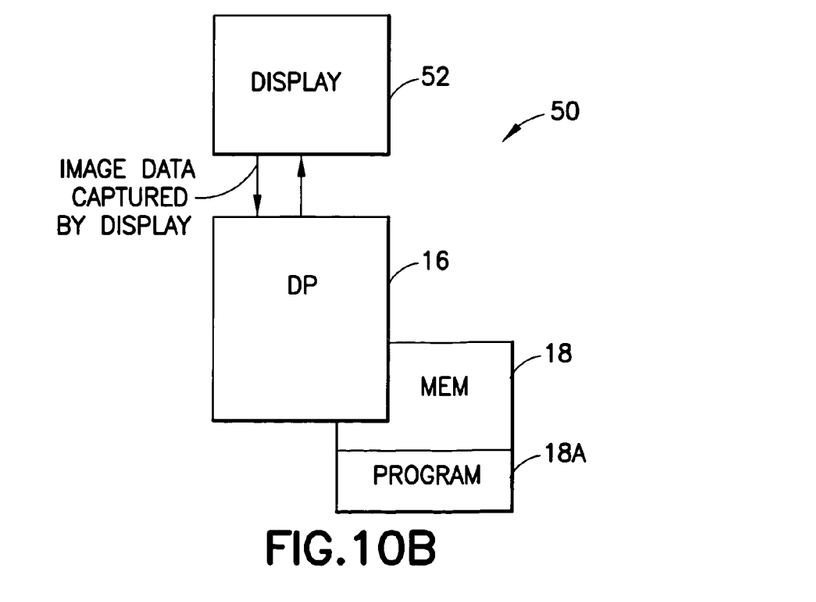
FIG. 10B is a simplified block diagram of a device having a display capable of generating an image of one or more fingertips.

FIG. 10B shown a block diagram of an exemplary device 50 having a display 52 that is capable of recording an image of the user's finger tip(s), such as the images depicted in FIGS. 8 and/or 10A. The display 52 in this case may be one constructed in accordance with the Active Matrix LCD with Integrated Optical Touch Screen (AMLCD) display device technology referenced above. Note that advanced scanning (e.g., text and bar codes) is possible to accomplish. In other embodiments a separate camera or cameras may be provided so as to image the user's finger(s)/hand(s), such as through the transparent surface of the display 52.

In the example shown in FIG. 10A the display 52 simultaneously captures images of the user's fingertips at five discrete locations on the surface of the display 52. Note that this particular pattern may be interpreted as being one particular gesture, whereas the presence of four fingertips (e.g., not the thumb) may be interpreted as being another particular gesture. The spacing between five or fewer fingertips may be varied to encode a plurality of different gestures, as can differences in angular orientations of the fingertips one to another.

Figure 9:
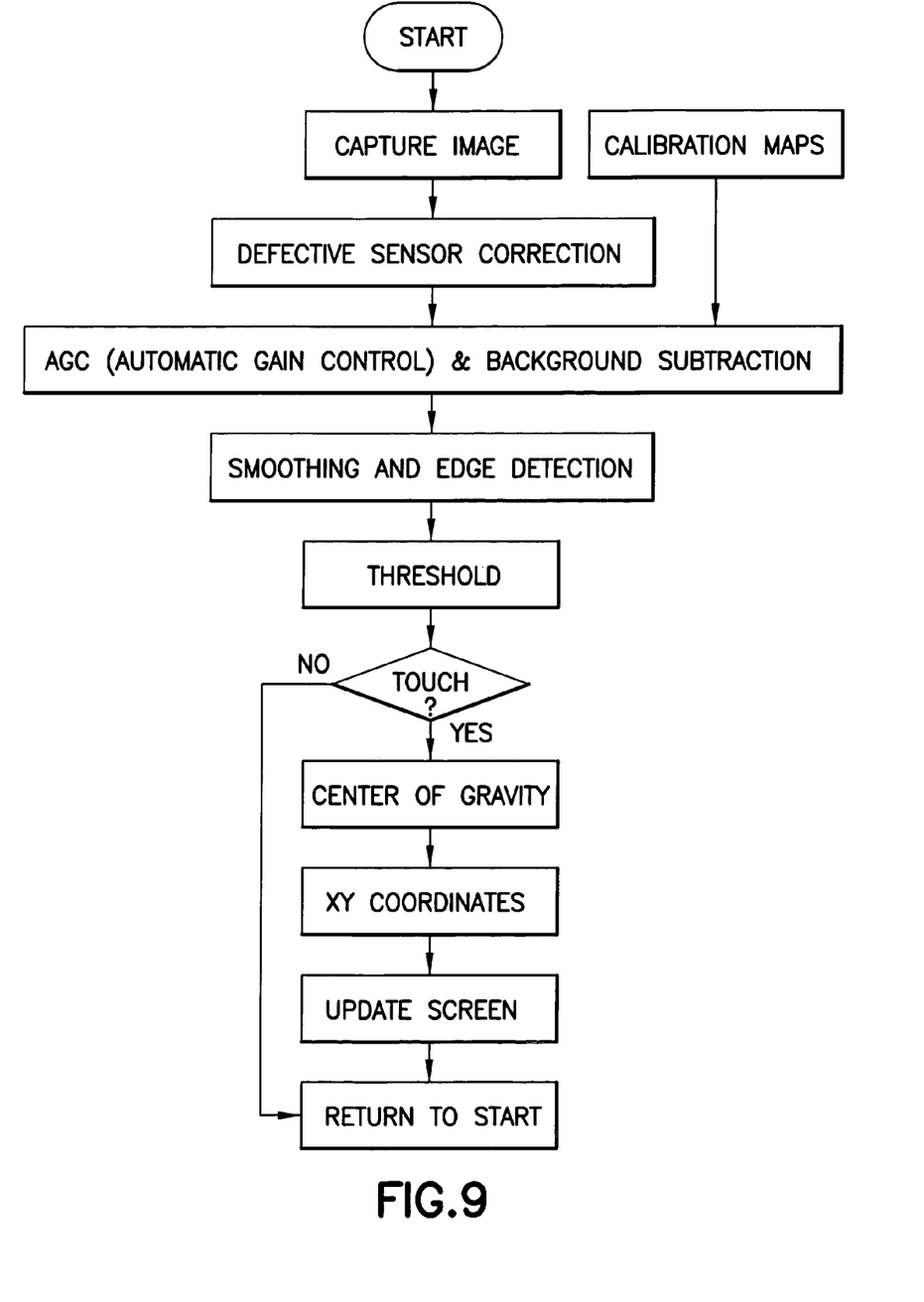
FIG. 9 is a logic flow diagram depicting an exemplary finger detection process executed by the device shown in FIG. 10B, and that is suitable for capturing the finger-based gestures shown in FIG. 8 and 10A.

The program 18A may be adapted to execute a program in accordance with the logic flow diagram shown in FIG. 9 (see also FIG. 6 of the above-referenced publication: 59.3, A. Abileah et al., "Integrated Optical Touch Panel in a 14.1" AMLCD").

In general, the tips of fingers are extracted from the captured image and the extraction results are recorded. Based on these records, the system decides whether to begin the recognition process. Regardless of whether the recognition process begins, the system also needs to determine whether to and when to delete stored records (this may be timer based). Whenever a new image is captured, all or at least some of the steps are repeated.

The fingertip in the captured image (feature 40 in FIG. 8) can be considered as an object described by data expressive of, as non-limiting examples, a center of gravity, a bounding edge, and a different brightness than the background. There are many image segmentation methods that may be used for fingertip image extraction. One exemplary and non-limiting segmentation method is the Watershed method.

Briefly, the Watershed is a function that applies a morphological watershed operator to an image (a grayscale image typically). The watershed operator segments images into watershed regions and their boundaries. Considering the gray scale image as a surface, each local minimum can be thought of as the point to which water falling on the surrounding region drains. The boundaries of the watersheds lie on the tops of the ridges. The operator labels each watershed region with a unique index, and sets the boundaries to zero. Typically, morphological gradients, or images containing extracted edges are used for input to the watershed operator. Noise and small unimportant fluctuations in the original image can produce spurious minima in the gradients, which can lead to over segmentation. The use of a smoothing operator, or manually marking seed points, are two exemplary approaches to avoiding over segmentation. Further reference with regard to the Watershed function can be made to, for example, Dougherty, "An Introduction to Morphological Image Processing", SPIE Optical Engineering Press, 1992.

A set with three members can be used to represent the state of one fingertip: two for the coordinates of the tip and one to represent whether it touches the surface or not (touch state). A stack or queue is a suitable data structure for recording the coordinates when the finger tip touches the surface. A timer or counter may be used to record when the finger tip leaves the surface.

The task of gesture recognition in accordance with the exemplary embodiments of this invention is to select the correct command/operation from a set of candidates, according to the input gesture. The conditions for starting the gesture recognition step may depend on the content of the set. For example, if only the X mark and check mark (see FIGS. 8B, 8C) are included in the set, the condition can be set as a threshold for the number of continuous images which do not contain fingertips. If the zoom in/out gestures are added to the set, a new condition, when two fingertips are detected in one image (see FIG. 8D), can be used to initiate the gesture recognition process.

There are many different pattern recognition methods that may be employed for gesture recognition. For example, one based on statistical methods may be used as it is inherently its robust. Normalization and/or smoothing techniques may be included as part of the gesture recognition process.

The ability to record the states of fingertip images facilitates gesture recognition. However, these records should be deleted when they are not useful. For example, the records indicating the trace of the fingertip can be deleted as soon as the trace is recognized as a check mark (see FIG. 8C). However, for the zoom in/out gesture (see FIG. 8D), the trace may be deleted, preferably, only after the fingertips have left the surface of the display 52.

In general, it can be appreciated that an aspect of this invention is the sequential creation of individual ones of a plurality of records, where individual ones of the plurality of records comprise data descriptive of a location of the user-manipulated physical object at a corresponding point in time while the gesture is executed.

Note that in the various exemplary embodiments discussed above the DP 16 may be any type of suitable data processor, such as one embodied within an integrated circuit, and the memory 18 may be any type of suitable data storage device, including semiconductor-based and magnetic disk- or tape-based data storage devices.

In FIG. 8 is depicted the "image" recorded by the image-capable display 52 of the user's finger(s) in contact with the top surface of the display 52 when making the corresponding gesture. The feature labeled as 40 in FIG. 8 represents the current location (current image) of the user's finger tip(s), while the feature labeled as 42 represents the prior images made during motion of the user's finger tip(s), i.e., the finger tip trace that was referred to above. The arrows generally indicate the direction of motion of the finger tip 40.

The use of the display 52 can provide for one finger and multiple finger-based gestures to be recorded and processed in accordance with the exemplary embodiments of this invention. Several non-limiting examples are now provided.

One Finger-Based Commands/Protocols:

1. Gesture: Clockwise (CW)—Contra Clockwise (CCW) Circular Rotations (see FIG. 8A)

Attributed Command: Browsing/Scrolling/Listing applications

2. Gesture: Subsequent tapping by a single finger (Tap1-Tap1 . . . )

Attributed Command: Activate device/phone, Run/Execute pre-selected option

3. Gesture: Finger stays motionless (over certain time threshold) above some object/icon
Attributed command: Select the object/icon 4. Gesture: Finger stays above some item/object/icon/followed by slow movement
Attributed command: Select the item/object/icon till end of the move 5. Gesture: Crossed Perpendicular lines (X mark, see FIG. 8B)
Attributed command: Delete 6. Gesture: Perpendicular moving breach (Check mark, see FIG. 8C)
Attributed command: Acceptance & Verification 7. Gesture: Enclosed Curve around items/icons to be selected
Attributed command: Select group of items/icons Two Finger-Based Commands/Protocols:

8. Gesture: Linear approaching/digression(fingers approach, then move apart, and vice versa, see FIG. 8D)
Attributed command: Zoom-In/Out, Size adjustment 9. Gesture: Simultaneous touching of an icon/object by two fingers
Attributed command: Select the icon/object ready for size adjustment 10. Gesture: Simultaneous tapping by two fingers (Tap1&2, Tap1&2, repeated . . . )
Attributed command: High-level importance Acceptance & Verification 11. Gesture: One finger stays above an icon/object then object-specific menu appears; the other finger performs circular rotations and toggles through the menu options, lifting simultaneously both fingers up selects and executes a menu option
Attributed command/application: Select & Execute a menu option 12. Compounds
Appropriate combination of the basic gestures described above can be used to perform some of compound gestures such COPY, CUT, PASTE etc. For example;
COPY=SELECT+Check mark inside (performed in vicinity of selected item)
CUT=SELECT+X mark inside
PASTE is based on COPY assuming that an indicator of the clipboard content is visible on the screen after COPY, then one TAP on the clipboard may create PASTE command and paste the content at the pointer or pre selected item/icon The protocols described above enable manipulation and/or selection of objects on the display 52 by movements of a user-manipulated physical object, such as one or more fingers. The use of these protocols provide a large input capacity as well as design freedom for gesture-based commands and language, which can also be used to exploit the full power of the device 50. Gaming devices can also benefit from their use.

Figure 11:
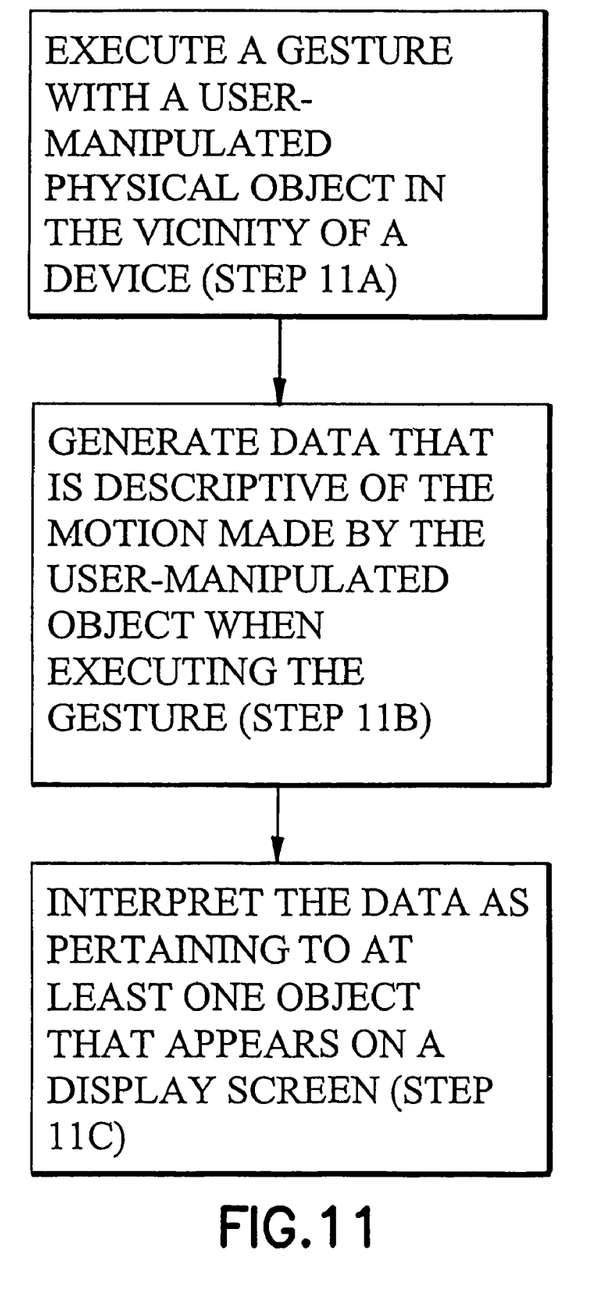
FIG. 11 is a logic flow diagram that depicts a method in accordance with the exemplary embodiments of this invention.

Referring to FIG. 11, in accordance with the various embodiments of this invention described above it can be appreciated that there is provided a method that includes executing a gesture with a user-manipulated physical object in the vicinity of a device (Step 11A); generating data that is descriptive of the motion made by the user-manipulated object when executing the gesture (Step 11B) and interpreting the data as pertaining to (e.g., a command) at least one object that appears on a display screen (Step 11C).

Note that different input/output (I/O) technologies can be used to implement the gesture based protocols, from touch screen displays (2D detection systems) to 3D detection systems such as the UST embodiments discussed above, or camera-based systems, or camera-microphone based virtual keyboards. Structured light systems, such as laser-based light projection/detection systems, can also be used, as may a touch pad input device, as additional non-limiting examples.

The use of these exemplary embodiments of this invention provide display dominated concept devices with a minimal number of required keys, provide for realizing a gesture-based input device, and further do not require any significant hardware to be provided. In addition, the commands and their interpretation can be determined by software protocols. Also, the use of these exemplary embodiments of this invention provide a possibility for command customization by the user (personalization). For example, the user may define the Delete gesture to be one different than the one shown in FIG. 8B, such as by defining a circle with a diagonal line drawn through it to be the Delete gesture.

In general, and as considered herein, the motion made by the user-manipulated physical object may comprise one or more of a substantially circular motion, a substantially linear motion, at least one substantially circular motion in combination with at least one substantially linear motion, at least one of a substantially circular motion and a substantially linear motion in combination with a period of substantially no motion, a substantially curved motion and a tapping motion. For a case where the user-manipulated physical object is comprised of at least two fingers of the user, the motion may comprise movement of one finger relative to at least one other finger. The data recorded may be descriptive of at least one of a velocity and an acceleration of the user-manipulated physical object. For the case where the user-manipulated physical object is comprised of at least one finger of the user, the data recorded may be descriptive of at least a shape assumed by the at least one finger.

Various modifications and adaptations may become apparent to those skilled in the relevant arts in view of the foregoing description, when read in conjunction with the accompanying drawings and the appended claims. As but some examples, the use of other similar or equivalent user input devices and technologies may be employed, such as resistive and/or capacitive-based touch pad or screen devices, as may other gestures and commands be attempted by those skilled in the art. However, all such and similar modifications of the teachings of this invention will still fall within the scope of this invention.

Further by example, the exemplary embodiments of this invention may provide an initial user training session where the user enters the same gesture several times when prompted by the program 18A in order to train the gesture recognition process to the particular finger motions and/or velocities, and possibly the finger tip size, that are characteristic of the user. This can be useful for, as an example, establishing the specific threshold or thresholds used by the gesture recognition processes.

Further by example, and for the two-dimensional embodiments of FIGS. 8-10, an actual touching of the surface of the display 52 may not be necessary if there is sufficient ambient lighting so that the finger tip image can be acquired even when the finger tip is not actually in contact with the surface of the display device. In this case the finger or finger tip image may be acquired optically within the three dimensional space in the vicinity of the device 50.

Still further, in some embodiments the UST system of FIGS. 1-7 may be used in the same device in conjunction with the hand, finger or finger tip image embodiments of FIGS. 8-10, and at any given time information derived from one or the other, or both, may be used for gesture recognition. In general, two or more similar or different object sensing technologies may be used together in the same device.

It can be noted that in the various illustrative embodiments of this invention that were described above the DP 16 may perform substantially all of the required processing, based on program instructions contained in the program 18A stored in the memory 18. However, it is also within the scope of the exemplary embodiments to perform at least some of the processing in the image acquisition system or subsystem itself, such as in the ultrasonic-based imaging system of FIGS. 1-7 or in the optical-based imaging system of FIGS. 8-10. For example, the actual image generation processing may be performed in the imaging system by a local embedded data processor, and the results may be passed to and processed by the DP 16 for performing the gesture recognition and interpretation operations.

Further, it may be appreciated that certain hand/finger gestures may be defined to have a standardized and universal meaning across different devices, applications and languages. One non-limiting example may be the index finger and thumb formed into a circle, with the remaining three fingers extended (an OK gesture), which may interpreted universally as, for example, "save and close a file". The use of the exemplary embodiments of this invention facilitates this type of operation.

In general, it may be appreciated that an aspect of the exemplary embodiments of this invention is a method, a computer program product and an apparatus that are responsive to a user executing a gesture with a user-manipulated physical object in the vicinity of a device to generate data that is descriptive of the presence of the user-manipulated physical object when executing the gesture and to interpret the data as pertaining to at least one object.

As employed herein the "presence of the user-manipulated physical object" may include, but need not be limited to, the spatial orientation of the user-manipulated physical object in two or three dimensional space, the repose of the user-manipulated physical object in two or three dimensional space, a shape formed by the user-manipulated physical object in two or three dimensional space, the motion being made by the user-manipulated physical object in two or three dimensional space, the velocity of the user-manipulated physical object in two or three dimensional space, the acceleration of the user-manipulated physical object in two or three dimensional space, and combinations thereof.

Figure 8A:
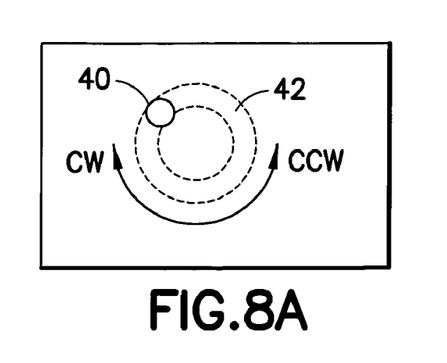
FIGS. 8A-8D, collectively referred to as FIG. 8, show exemplary finger-based gestures that may be used to select various commands for execution in accordance with further exemplary embodiments of this invention.
Figure 8B:
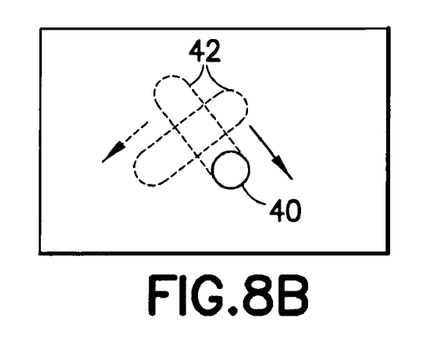
Figure 8C:
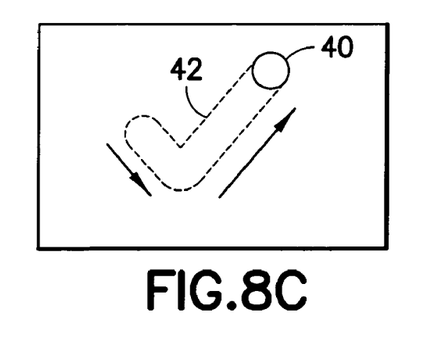
Figure 8D:
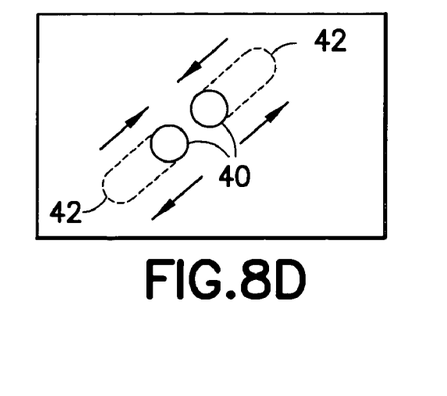

For example, the patterns traced by the user's fingertip when executing the gestures shown in FIG. 8A for the clockwise and contraclockwise fingertip motions may be identical (i.e., a circle or oval), however the two gestures are distinguishable one from the other by the sensing of the direction of the fingertip motion in real or substantially real time.

Note further that both fixed and scanning type sensors may be used, such as UST systems/components that scan an ultrasonic beam through the environment.

Furthermore, some of the features of the examples of this invention may be used to advantage without the corresponding use of other features. As such, the foregoing description should be considered as merely illustrative of the principles, teachings, examples and exemplary embodiments of this invention, and not in limitation thereof.

What is claimed is:

1. A method, comprising:
   detecting an execution of a gesture by a user's hand by tracking movements of said hand in the vicinity of a device within a limited sensing space defined by a plurality of ultrasonic transducers;
   identifying at least one object displayed by the device from the tracked movements;
   generating data that is descriptive of at least of a shape of the user's hand in three dimensional space when executing the gesture;
   capturing an image of fingertips of the user's hand;
   determining a number of fingertips from the captured image, a spacing between each fingertip and an angular orientation of each fingertip relative to one another;
   determining whether to begin a gesture recognition process, wherein determining whether to begin the recognition process comprises detecting a predetermined pattern of fingertip movement, a velocity of the fingertip movement or a size of the fingertip, the number, spacing and angular orientation of the fingertips corresponding to the predetermined fingertip pattern, and if the recognition process is begun;
   comparing a current image of the fingertips with at least one prior image of the fingertips to determine a fingertip trace corresponding to the executed gesture;
   displaying a pointer in at least one position corresponding to the executed gesture; and
   determining at least one command for said at least one object displayed by the device based at least in part on the data and the executed gesture.

2. The method of claim 1, where generating data generates data that is further descriptive of motion made by the user's hand over a period of time.

3. The method of claim 1, where generating data comprises sequentially creating individual ones of a plurality of records, where individual ones of the plurality of records comprise data descriptive of a location of the user's hand at a corresponding point in time while the gesture is executed.

4. The method of claim 1, where generating data uses a plurality of imaging devices.

5. The method of claim 4, where the plurality of imaging devices comprise a part of a display screen.

6. The method of claim 1, where the gesture comprises at least one of a substantially circular motion, a substantially linear motion, at least one substantially circular motion in combination with at least one substantially linear motion, a substantially circular motion and a substantially linear motion, in combination with a period of substantially no motion, a substantially curved motion, and a tapping motion.

7. The method of claim 1, where the gesture executed with the user's hand is comprised of the use of at least two fingers, and where a motion made when executing the gesture comprises movement of one finger relative to at least one other finger.

8. The method of claim 1, where the data is further descriptive of at least one of a velocity and an acceleration of the user's hand.

9. The method of claim 1, where the data is further descriptive of at least one of a spatial orientation of the user's hand in two or three dimensional space, and the repose of the user's hand in two or three dimensional space.

10. An apparatus, comprising:
    a display configured to display information;
    a sensor arrangement that is responsive to the user executing a gesture with a user's hand in the vicinity of a surface of the apparatus and configured to track movements of said hand within a limited sensing space defined by a plurality of ultrasonic transducers, the sensor arrangement configured to provide data descriptive of at least the shape of the user's hand in three dimensional space when executing the gesture, capture an image of fingertips of the user's hand, and determine a number of fingertips from the captured image, a spacing between each fingertip and angular orientation of each fingertip relative to one another;

a processor coupled to the sensor arrangement and configured to determine whether to begin a gesture recognition process, wherein determining whether to begin the recognition process comprises detecting a predetermined pattern of fingertip movement, a velocity of the fingertip movement or a size of the fingertip, the number, the spacing and angular orientation of the fingertips corresponding to the predetermined fingertip pattern, and if the recognition process is begun, compare a current image of the fingertips with at least one prior image of the fingertips to determine a fingertip trace corresponding to the executed gesture; and the processor further being configured to interpret the data to identify at least one object from the tracked movements, to identify the executed gesture, and to determine at least one command for said at least one object based at least in part on the identified gesture and the executed gesture.

11. The apparatus of claim 10, where said data generating means generates data that is further descriptive of motion being made by the hand or portion of the hand in two or three dimensional space, and where data generating means is comprised of at least one of a plurality of acoustic sensors and a plurality of light sensors.

12. The apparatus of claim 10, embodied in a device that comprises means for conducting wireless communications.

13. The apparatus of claim 10, where the data is further descriptive of at least one of a spatial orientation of at least a part of the user's hand in two or three dimensional space, and the repose of at least a part of the user's hand in two or three dimensional space.

14. A non-transitory computer readable medium tangibly embodying a computer program, execution of the computer program by at least one data processor resulting in operations that comprise:

detecting an execution of a gesture by a user's hand by tracking movements of said hand in the vicinity of a device within a limited sensing space defined by a plurality of ultrasonic transducers;

in response to detecting a user executing a gesture with a user's hand in the vicinity of a device, identifying at least one object from the tracked movements and generating data that is descriptive of at least the shape of the user's hand in three dimensional space when executing the gesture, capturing an image of fingertips of the user's hand, and determining a number of fingertips from the captured image, a spacing between each fingertip and angular orientation of each fingertip relative to one another;

determining whether to begin a gesture recognition process, wherein determining whether to begin the recognition process comprises detecting a predetermined pattern of fingertip movement, a velocity of the fingertip movement or a size of the fingertip, the number, spacing and angular orientation of the fingertips corresponding to the predetermined fingertip pattern, and if the recognition process is begun;

comparing a current image of the fingertips with at least one prior image of the fingertips to determine a fingertip trace corresponding to the executed gesture;

displaying a pointer in at least one position corresponding to the executed gesture; and determining at least one command for said at least one object to the user based at least in part on the data and the executed gesture.

15. The computer readable medium of claim 14, where generating data generates data that is further descriptive of a motion made by the user's hand over a period of time.

16. The computer readable medium of claim 14, where generating data comprises sequentially creating individual ones of a plurality of records, where individual ones of the plurality of records comprise data descriptive of a location of the user's hand at a corresponding point in time while the gesture is executed.

17. The computer readable medium of claim 14, where generating data uses a plurality of imaging devices.

18. The computer readable medium of claim 17, where the plurality of imaging devices comprise a part of a display screen.

19. The computer readable medium of claim 14, where generating data generates data that is further descriptive of a motion made by the user's hand in at least one of two dimensional space and three dimensional space, where the motion comprises at least one of:
    a substantially circular motion;
    a substantially linear motion;
    at least one substantially circular motion in combination with at least one substantially linear motion;
    a substantially circular motion and a substantially linear motion, in combination with a period of substantially no motion;
    a substantially curved motion; and
    a tapping motion.

20. The computer readable medium of claim 19, where the user's hand is comprised of at least two fingers of a user, and where the motion comprises movement of one finger relative to at least one other finger.

21. The computer readable medium of claim 14, where the data is further descriptive of at least one of a velocity and an acceleration of the user's hand.

22. The computer readable medium of claim 14, where the data is further descriptive of at least one of a spatial orientation of at least a part of the user's hand in two or three dimensional space, and the repose of at least a part of the user's hand in two or three dimensional space.

23. A device, comprising:
    a unit configured to display information;
    an imaging system configured to generate data that is descriptive of at least the shape of a user's hand in three dimensional space when executing a gesture, where the imaging system comprises a plurality of ultrasonic transducers arranged so as to transmit acoustic energy into a volume of space substantially adjacent to a surface of the device;
    a data processor; and
    at least one memory including computer program code, the at least one memory and the computer program code configured to, with the at least one processor, cause the device to perform at least the following:
    detecting an execution of the gesture by said hand by tracking movements of said hand in the vicinity of a device within a limited sensing space, capturing an image of fingertips of the hand, and determining a number of fingertips from the captured image, including a spacing between each fingertip and angular orientation of each fingertip relative to one another;
    determining whether to begin a gesture recognition process, wherein determining whether to begin the recognition process comprises detecting a predetermined pattern of fingertip movement, a velocity of the fingertip movement or a size of the fingertip, the number, spacing and angular orientation of the fingertips corresponding to the predetermined fingerprint;

identifying at least one object from the tracked movements;

displaying a pointer in at least one position corresponding to the tracked movements; and determining at least one command for said at least one object based at least in part on the data and the executed gesture.

24. The device of claim 23, where said imaging system generates data by sequentially creating individual ones of a plurality of records, where individual ones of the plurality of records comprise data descriptive of a location of the user's hand at a corresponding point in time while the gesture is executed.

25. The device of claim 23, where said imaging system employs at least one of acoustic energy and optical energy.

26. The device of claim 23, said imaging system being responsive to a motion made by the user's hand in three dimensional space, where the motion comprises at least one of:

a substantially circular motion;

a substantially linear motion;

at least one substantially circular motion in combination with at least one substantially linear motion;

a substantially circular motion and a substantially linear motion, in combination with a period of substantially no motion;

a substantially curved motion;

a tapping motion; and movement of one finger relative to at least one other finger.

27. The device of claim 23, where the data is further descriptive of at least one of a velocity and an acceleration of the user's hand.

28. The device of claim 23, where the data is further descriptive of at least one of a spatial orientation of at least a part of the user's hand in two or three dimensional space, and the repose of at least a part of the user's hand in two or three dimensional space.

29. The method of claim 1, further comprising projecting a view of an image to be displayed.

30. The computer readable medium of claim 14, where the operations further comprise projecting a view of an image to be displayed.

31. The device of claim 23, further comprise a projector configured to project a view of an image to be displayed.

32. The method of claim 1, wherein the pattern of the executed gesture is determined from one or more of the number of fingertips, a spacing between each of the fingertips or an angular orientation of each of the fingertips.

33. The apparatus of claim 10, wherein the pattern of the executed gesture is determined from one or more of the number of fingertips, a spacing between each of the fingertips or an angular orientation of each of the fingertips.

* * * * *